Jan. 28, 1964 R. DI RICO 3,119,430
SELF-LOCKING NUT AND THE LIKE
Original Filed Jan. 7, 1958

INVENTOR.
Rocco Di Rico
BY Rines and Rines
ATTORNEYS

United States Patent Office 3,119,430
Patented Jan. 28, 1964

3,119,430
SELF-LOCKING NUT AND THE LIKE
Rocco Di Rico, Mountain Lakes, Groton, Mass., assignor of one-half to Charles Maliotis, Belmont, Mass.
Continuation of application Ser. No. 707,625, Jan. 7, 1958. This application Feb. 1, 1963, Ser. No. 256,203
3 Claims. (Cl. 151—7)

The present invention relates to self-locking nuts and the like, and is a continuation of Serial No. 707,625, filed January 7, 1958, now abandoned.

For years, the art has struggled with the problem of providing a self-locking nut structure that vibration cannot loosen and/or that moisture or liquids cannot penetrate. A large number of different structures have been manufactured and marketed, such as nuts employing various types of lock washers, off-angle and off-lead threads, slotted and indented constructions, resilient arched nuts, grooved nuts having nylon or other plastic or fibrous inserted washers, nuts having one or more apertures for receiving plastic material to lock the threads of bolts or screws assembled therewith, nuts with prongs for engaging the bolt or screw threads, and peened threads, to mention but a few of the more common constructions. Unfortunately, however, these prior locking-nut devices require multi-step manufacturing and assembling techniques in their fabrication, which has an appreciable effect upon the ultimate cost of the devices. Some of these prior locknuts, moreover, are only usable once, their removal destroying the locking feature. More than this, such locknut assemblies are not satisfactorily moisture proof, and, in addition, must be specially treated to render them resistant to chemical attack by fluids, oils, greases, fungus, etc.

An object of the present invention, accordingly, is to provide a new and improved locknut that shall not be subject to any of the above-described disadvantages but that, through a novel unitary construction, provides an inexpensive self-locking nut that is automatically resistant to environmental chemical influences. In summary, this end is attained through preferably molding the nut from a resilient material to provide therein a threaded recess and an unthreaded extension thereof of cross-section less than that of the threaded recess.

Other and further objects will be explained hereinafter and will be more particularly pointed out in the appended claims.

The invention will now be described in connection with the accompanying drawing FIG. 1 of which is a side-elevation of a preferred embodiment of the invention, the figure being partly broken away to illustrate details of construction;

Figure 1:
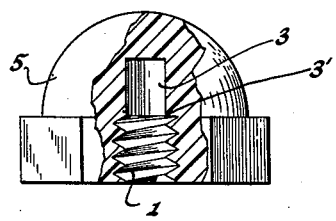

Referring to FIG. 1, a locknut 5 of dome-shaped or "acorn" construction is shown provided with a threaded recess 1 having an unthreaded, preferably, though not essentially, cylindrical extension 3, of less cross-dimension than that of the threaded portion 1. In accordance with the invention, the locknut 5 is a unitary structure, formed as by molding, from resilient material; preferably a plastic such as, for example, nylon and the like. The threaded and unthreaded recess portions 1 and 3 may thus be fabricated within the nut 5 during the molding of the same. The cross-dimension of the unthreaded extension is preferably, though not essentially, substantially equal to the inner diameter of the threads of the threaded portion 1, as illustrated.

Figure 2:
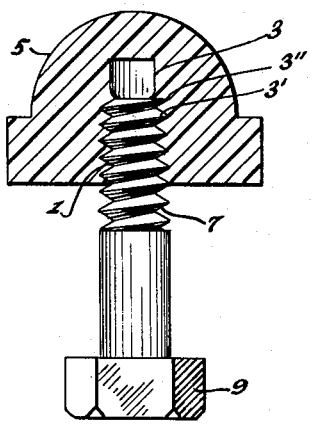
FIG. 2 is a longitudinal section of the locknut of FIG. 1 showing a bolt or screw locked therein.

When an appropriate threaded bolt or screw 7 is received within the threads of recess 1, FIG. 2, it may readily be advanced to the mouth or lower end 3' of the unthreaded extension 3, where, because of the reduced diameter or cross-dimension of the extension 3, it is prevented from further advancement. By applying a wrench to the head 9 of the bolt or screw 7, the bolt or screw 7 may be forced to "bite" into the resilient material of the walls of the unthreaded reduced diameter recess portion 3, as shown at 3'', thereby automatically self-locking the bolt or screw 7 within the nut 5. In order to obtain a sufficiently strong lock that can successfully resist vibration or other forces tending to rotate the bolt or screw 7 loose from the locknut 5, it has been found that it is not necessary for the length of the unthreaded portion 3 to be as great as that of the threaded portion 1; and the length of the unthreaded portion 3 may, indeed, be a smaller fraction of the length of the threaded portion 1 than is shown in the drawings.

Experiments with a nylon nut of the type shown in FIGS. 1 and 2, molded from "Zytel" 101 type resin (Du Pont Company), locking with a steel number ten bolt having 24 threads per inch, demonstrate that from 8 to 16 inch-pounds of torque are required to lock the bolt successive half-turns beyond finger-tightness; i.e. in the initial part of the region 3. A lock obtained with 2½ half-turns in the region 3, moreover, would not release until as much as 16 inch-pounds of releasing torque were applied. Since nylon and similar materials tend to "creep" under load, it was further found that a slightly greater release torque of the order of 18 inch-pounds was required after the bolt was locked within the nut for twenty four hours.

Figure 3:
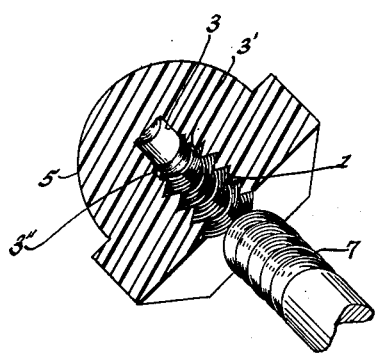
FIG. 3 is a fragmentary perspective of the apparatus of FIG. 2 after the bolt or screw has been unlocked and removed.

In view of the resilient character of the material of the unitary locknut 5, furthermore, it has been found that, upon forcibly withdrawing the bolt or screw therefrom, the forced threads cut by the bolt 7 in the portion 3'' tend at least partially to close up, as more particularly shown in FIG. 3, thus rendering the locknut usable for further locking operations. In fact, successful locking and unlocking of the before-described "Zytel" locknuts have been carried out at least as many as fifteen times, each time requiring substantially the same release torque; in the previous example, of the order of 16 inch-pounds.

The particular dome-shaped or "acorn" locknut 5 of FIGS. 1, 2 and 3, of course, protects the portion of the bolt 7 received therein from moisture, fungus, chemical attack, and seepage of fluids between the nut and the bolt. The "Zytel" nylon plastic itself, of course, is highly moisture and fungus resistant, is completely non-magnetic, and is resistant to chemical attack by oils, greases, hydrolysis and other environmental conditions, as distinguished from the metal locknuts of the present day. In addition, such plastic materials can stand up under conditions of both high and low temperature use. This type of molded locknut, moreover, easily lends itself to fabrication in different colors, which may be particularly useful for employment in such applications as, for example, outdoor-furniture and the like.

Figure 6:
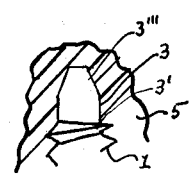
FIG. 6 is a fragmentary sectional view of a further modification.

The unthreaded locking region 3 may also be provided with a region of still less cross-section as, for example, by tapering the same at 3''', FIG. 6, in order to indicate, by increased required locking torque, that the bolt has been adequately advanced for a satisfactory lock.

Figure 4:
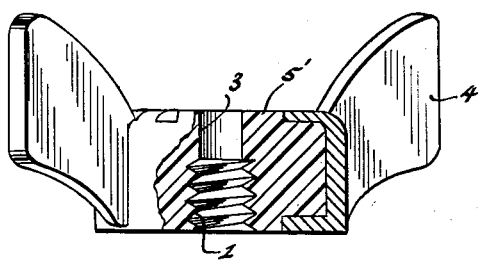
FIGS. 4 and 5 are views similar to FIG. 1 of modifications.
Figure 5:
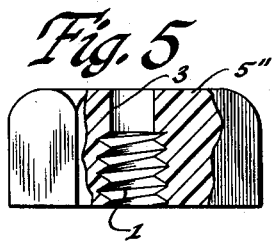

The invention is not, of course, limited to dome-shaped locknuts. A wingnut is thus shown in FIG. 4, having a molded locknut portion 5' provided with metal wings 4. If desired, of course, the wings 4 may be integrally molded with the locknut 5' to provide a complete plastic or other wingnut. The threaded recess portion 1 extends upward from the lower surface of the nut 5', and the unthreaded portion 3 is shown preferably terminating at the upper surface of the nut 5'. A similar molded hexagonal locknut is shown at 5" in FIG. 5. Other configurations may also obviously be employed, as may other types of resilient material suitable for molding and similar operations, including "Zytel" 105 nylon material (Du Pont Company), which is particularly adapted for outdoor and marine use; "Delrin" plastic (Du Pont Company); "Lexan" polycarbonate plastic (General Electric Company); and even powdered metals, to mention but a few such materials.

Further modifications will occur to those skilled in the art and all such are considered to fall within the spirit and scope of the invention as defined in the appended claims.

What is claimed is:

1. A unitary self-locking nut constituted entirely of resilient nylon, said nut being characterized by a high stripping torque and being capable of being used and reused repeatedly without a significant reduction in said stripping torque, said nut comprising a base portion and a substantially semi-spherical dome portion, said base portion having a substantially flat bolt-head-opposing surface, said nut having a bolt receiving recess extending from an opening in said bolt-head-opposing surface through said base portion to a point within said dome portion, said recess having in sequence a first, threaded portion extending through said base portion and a second, locking portion substantially entirely within said dome portion, said locking portion being smooth and unthreaded and having a diameter equal to the inner diameter of the threads of said threaded portion, whereby a threaded bolt with an inner and outer thread diameter substantially equal to the inner and outer thread diameter of said threaded portion of said recess will, when threaded therewith, bite into said smooth, unthreaded locking portion of said recess to provide said high stripping torque, said nylon being sufficiently resilient that the threads cut by said bolt in said locking portion of said recess will tend to close upon removal of said bolt, whereby said nut can be reused repeatedly without a significant reduction in said stripping torque.

2. The nut of claim 1, wherein said second recess portion is substantially shorter than said first recess portion.

3. The nut of claim 2, wherein said recess comprises a third, tapered terminal portion following said second portion.

References Cited in the file of this patent

UNITED STATES PATENTS

| | | |
|---|---|---|
| 2,390,726 | Mitchell | Dec. 11, 1945 |
| 2,390,759 | Warren | Dec. 11, 1945 |
| 2,439,415 | Bloomfield | Apr. 13, 1948 |
| 2,549,939 | Shaw et al. | Apr. 24, 1951 |
| 2,788,829 | Edwards | Apr. 16, 1957 |
| 2,862,537 | Poupitch | Dec. 2, 1958 |
| 3,001,567 | Brill | Sept. 26, 1961 |

FOREIGN PATENTS

| | | |
|---|---|---|
| 133,892 | Australia | Aug. 15, 1949 |